United States Patent [19]

Guity-Mehr

[11] Patent Number: 4,873,396
[45] Date of Patent: Oct. 10, 1989

[54] WALL ELECTRICAL COVER PLATE

[75] Inventor: Hossein F. Guity-Mehr, Long Beach, Calif.

[73] Assignee: Texim International, Irvine, Calif.

[21] Appl. No.: 184,411

[22] Filed: Apr. 21, 1988

[51] Int. Cl.⁴ .............................................. H05K 5/03
[52] U.S. Cl. ........................................ 174/66; 411/372
[58] Field of Search .................. 174/66, 67; 220/241, 220/242; 439/536; 411/371, 372

[56] References Cited

U.S. PATENT DOCUMENTS

| | | | |
|---|---|---|---|
| 264,776 | 9/1882 | Sharp | 411/372 X |
| 3,518,356 | 6/1970 | Friedman | 174/66 |
| 4,136,598 | 1/1979 | Hughes | 411/372 |

Primary Examiner—Arthur T. Grimley
Assistant Examiner—David A. Tone

[57] ABSTRACT

A cover plate having a back surface defining a covered M groove is presented. The cover plate M groove is hooked over one screw of an electrical wiring device. The second screw then screws into the cover plate and sits deep in the cover plate screw groove. A decorative cover or plug then covers the second screw, so that no screw shows on the front surface farthest from the wall after installation and the cover plate is securely coupled to the wall by the installation of only one mounting screws, rather than two as required by prior art cover plates.

2 Claims, 3 Drawing Sheets

WALL ELECTRICAL COVER PLATE

BACKGROUND OF THE INVENTION

1. Field of the Invention

The present invention relates to wall electrical cover plates utilizing only one mounting screw for installation and having no visible screws after installation.

2. Description of the Prior Art

Electrical wires have been installed in walls for about one hundred years. The wires generally interface with the wall surface at sockets, plugs and switches. Wall electrical cover plates generally cover plugs and switches to protect occupants of the building, and particularly children or infants from shock or even electrocution which might be caused by contact with a wire or other surface conducting electricity. These electrical wall cover plates are typically thin rectangles slightly smaller than three by five inches fabricated from an electrically insulating, durable material such as a selected plastic. They are frequently decorated. The prior art electrical wall cover plates known to applicant have two round holes or grooves therethrough centered along the longitudinal axis, one near each end. These holes are placed so as to mate with screws which pass through the electrical wall cover plate and couple the electrical wall cover plate to the electrical switch or plug, etc. which the electrical wall cover plate covers. To install or remove a prior art electrical wall cover plate, one must install or remove two screws, one on each end. The screw heads are then visible.

A more ideal electrical wall cover plate could be installed by the use of only one screw, thereby cutting in half installation and removal time. While it does not take long to install or remove a screw, there are billions of electrical wall cover plates with many millions being installed or removed each year, so the total time wasted because of that second screw is enormous. In addition many think the visible screw heads are unsightly, so such an ideal electrical wall cover plate would include, when installed, a front surface undefiled by screw heads, the one screw head being covered. Covering the screw head would also reduce the chance of a child through curiosity removing the electrical wall cover plate and being shocked or electrocuted by touching a then exposed electrically conducting surface.

SUMMARY OF THE INVENTION

A wall cover plate for covering prior art electrical wiring devices and the like is presented. Electrical wiring devices is defined as switches, plugs, receptacles and the like at or near a wall surface. The cover plate comprises:

a front surface farthest from the wall after installation;

a back surface, part of which back surface defines an M-groove near the center bottom of said back surfaces, said M-groove capable of mating with a protruding screw coupled to an electrical wiring device installed in the wall;

an interior surface communicating between front and back surfaces and defining only one screw groove having the same relative orientation as either one of the two screw grooves in prior art wall cover plates; and a screw groove cover removably coupling to said screw groove.

The screw groove is oriented so that hooking the M-groove over one of the two screws on a prior art electrical wiring device, which screw would pass through the first of the two screw grooves of a prior art electrical wall cover plate causes the screw groove of the present invention to be oriented after installation where the second screw groove of a prior art electrical wall cover plate would be oriented. The present invention differs from the prior art in that only one screw need be used for installation on or removal from prior art electrical wiring devices. This reduces the time for installation or removal by nearly one half.

In addition, the screw groove cover covers the only screw coupling the present electrical wall cover plate to the electrical switch or plug, so no screw is visible after installation.

A screw groove cover notch is defined by the surface of the screw groove cover. Said notch is capable of receiving force and transmitting said force to the screw groove cover to remove the screw groove cover from the cover plate.

At least two and in a preferred example three screw groove cover hooks are capable of removably mating with interior surfaces of the cover plate to removably couple the screw groove cover to the cover plate.

DRAWING DESCRIPTION

Reference should be made at this time to the following detailed description which should be read in conjunction with the following drawings, of which:

DETAILED DESCRIPTION

Figure 1:
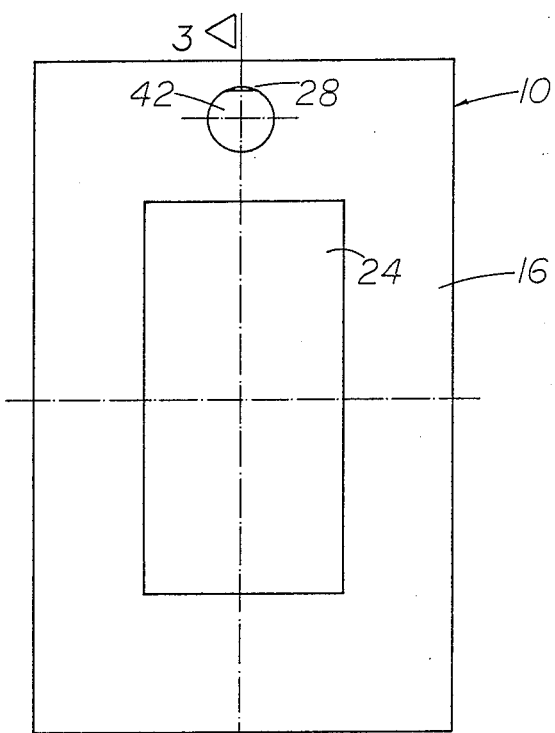
FIG. 1 is a front view of an electrical wall cover plate according to the present invention.

A wall cover plate 10 for covering prior art electrical switches and the like is presented. The cover plate 10 comprises:

a front surface 16 farthest from the wall 11 after installation;

a back surface 18, part of which back surface 18 defines an M-groove 20 near the center bottom of said back surface 18, said M-groove 20 capable of mating with a protruding screw 34 coupled to an electrical circuit (not shown) installed on the wall 11;

an interior surface 22a communicating between front 16 and back 18 surfaces and defining only one screw groove 22; and a screw groove cover 42 removably coupling to said screw groove 22.

The screw groove 22 is oriented so that hooking the M-groove 20 over one of the two screws 34 on a prior art electrical switch, which screw 34 would pass through the first of the two screw grooves of a prior art electrical wall cover plate (not shown) causes the screw groove 22 of the present invention to be oriented after installation where the second screw groove of a prior art electrical wall cover plate 34 would be oriented. The present invention differs from the prior art in that only one screw 34 need be tightened or loosened for installation on or removal from prior art electrical wall plugs, switches, etc. This reduces the time for installation or removal by nearly one half.

In addition, the screw groove cover 42 covers the only screw 34 coupling the present electrical wall cover plate 10 to the electrical circuit (not shown) such as a switch or plug, so no screw 34 is visible after installation.

Figure 2:
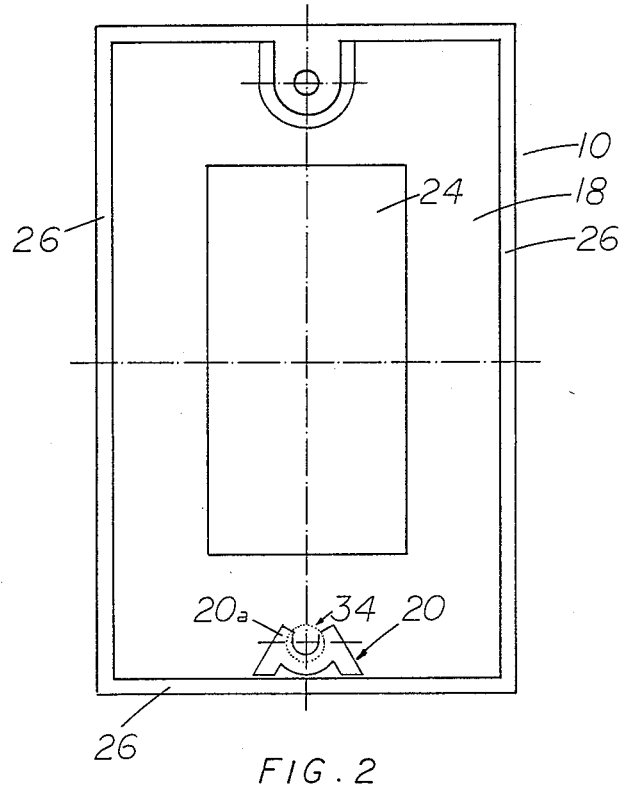
FIG. 2 is a back view of an electrical wall cover plate according to the present invention.
Figure 3:
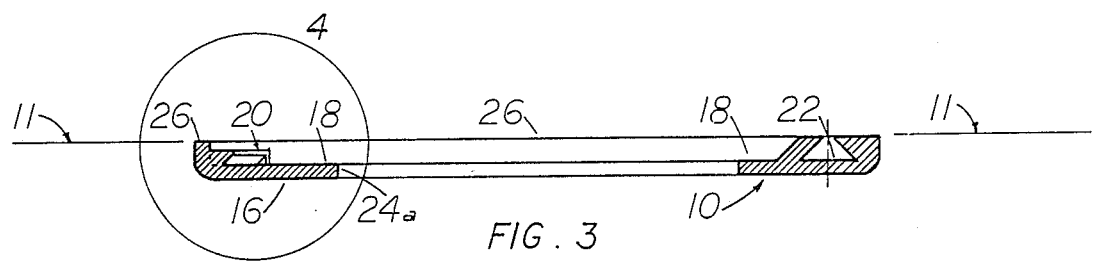
FIG. 3 is a cut away longitudinal section view along the line 3—3 of FIG. 1.
Figure 4:
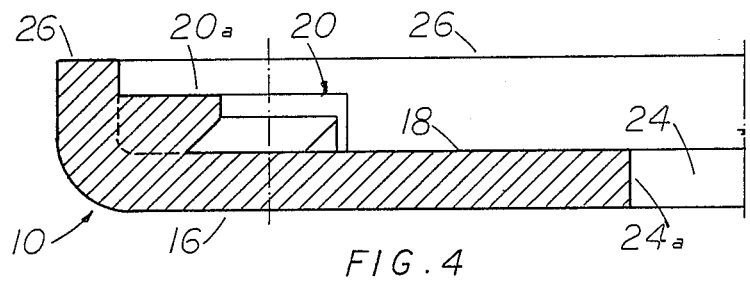
FIG. 4 is a partially cut away enlarged longitudinal section view of part of FIG. 3.
Figure 5:
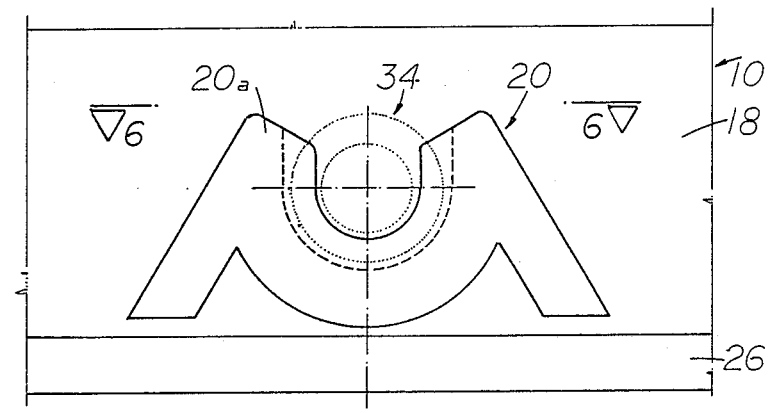
FIG. 5 is a view showing the M-groove in more detail.
Figure 6:
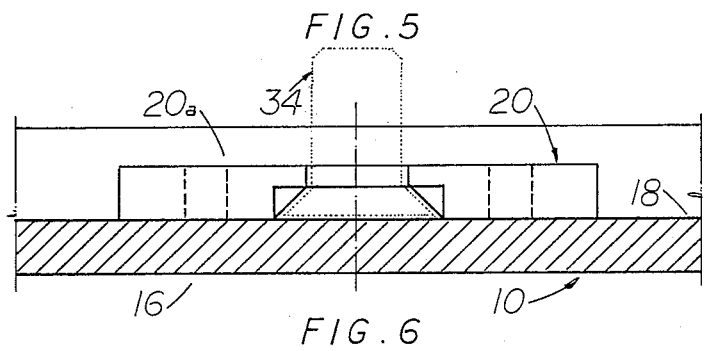
FIG. 6 illustrates part of the M-groove from an angle along the line 6—6 of FIG. 5 differing by 90 degrees from the view of FIG. 5.
Figure 7:
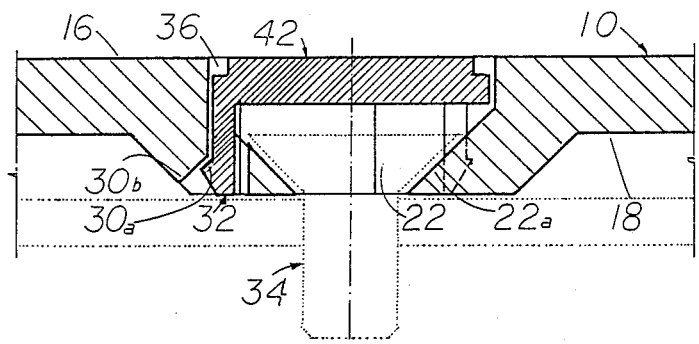
FIG. 7 is a partially cut away horizontal section view of the screw groove along the line 7—7 of FIG. 9.
Figure 8:
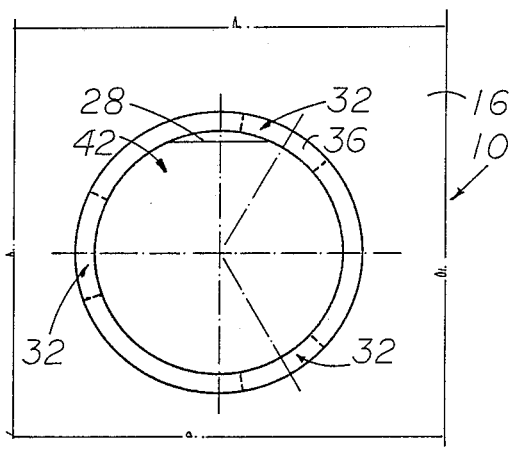
FIG. 8 illustrates a top view of the screw groove of FIG. 7.
Figure 9:
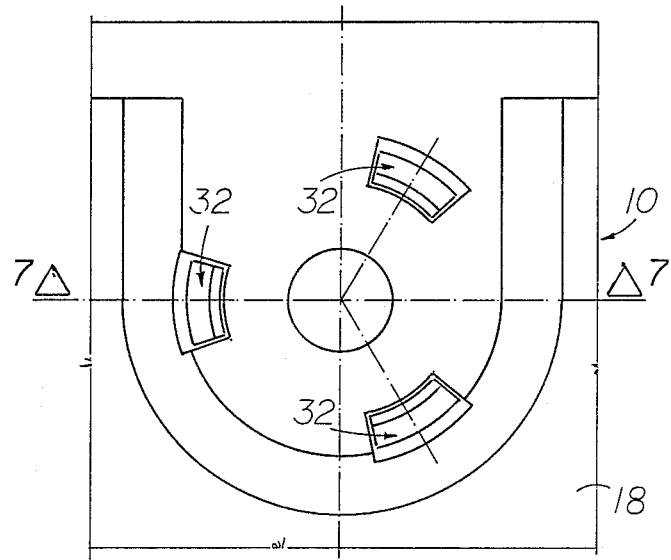
FIG. 9 illustrates a bottom view of the screw groove of FIG. 7.

FIGS. 1 and 2 illustrate an opening 24 defined by edge 24a similar to the central openings of prior art cover plates. FIGS. 2-5 illustrate an edge 26 similar to the edges of prior art cover plates. FIGS. 7 and 8 illustrate a screw groove cover 42 having a notch 28 utilized to remove the screw groove cover 42 by inserting a fingernail, screw driver blade or similar edge (not shown) into the notch 28 and lifting. FIG. 7 illustrates surface 30b of cover plate 10 which removably couples to surface 30a of screw groove cover 42 to retain screw groove cover 42 in place over screw 34. Surface 30a is part of one of three hooks 32 illustrated on FIGS. 7-9 which hooks 32 retain screw groove cover 42 in place after screw groove cover 42 is pushed down over screw groove 22 as shown in FIG. 1. Screw groove 22 is shown in FIGS. 3 and 7. FIG. 7 illustrates a groove 36 around the exterior surface of screw groove cover 42. The surface 20a defining the M groove 20 is best shown in FIGS. 2-6.

A particular example of the invention has been described herein. Other examples will be obvious to those skilled in the art. The invention is limited only by the following claims.

I claim:

1. A wall cover plate for covering prior art electrical wiring devices and the like, said cover plate comprising:
   a front surface farthest from the wall after installation;
   a back surface opposite the front surface, part of which back surface defines an M-groove near the center bottom of said back surface, said M-groove capable of mating with a protruding screw coupled to an electrical wiring device installed on the wall;
   an interior surface communicating between front and back surfaces and defining only one screw groove oriented such that coupling the M-groove to one of the two screws protruding from a prior art installed electrical wiring device such as a switch permits the second of said two electrical wiring device screws to pass through the center of the screw groove, which screw groove has a diameter just slightly greater than the diameter of the electrical wiring device screw; and
   a screw groove cover removably coupling to said screw groove to cover the head of the screw therethrough after installation.

2. The invention of claim 1, further including:
   a screw groove cover notch defined by the surface of the screw groove cover, said notch capable of receiving force and transmitting said force to the screw groove cover to remove the screw groove cover from the cover plate; and
   at least two screw groove cover hooks capable of removably mating with interior surfaces of the cover plate to removably couple the screw groove cover to the cover plate.

* * * * *